United States Patent [19]
Kameda et al.

[11] Patent Number: 5,413,014
[45] Date of Patent: May 9, 1995

[54] CONSTRUCTION OF VEHICLE POWER TRAIN

[75] Inventors: Osamu Kameda, Hiroshima; Junichi Okita, Yamaguchi; Sakumi Hasetoh, Hiroshima; Ichiro Hirose, Hiroshima; Yoshimichi Tanaka, Hiroshima, all of Japan

[73] Assignee: Mazda Motor Corporation, Hiroshima, Japan

[21] Appl. No.: 36,703

[22] Filed: Mar. 25, 1993

[30] Foreign Application Priority Data

Mar. 27, 1992 [JP] Japan .................................. 4-071602
Mar. 27, 1992 [JP] Japan .................................. 4-071647

[51] Int. Cl.⁶ .......................... B60K 5/04; F02F 1/10; F16H 57/02
[52] U.S. Cl. .................. 74/606 R; 92/171.1; 180/297
[58] Field of Search ..................... 74/606 R; 180/297; 92/144, 171.1

[56] References Cited

U.S. PATENT DOCUMENTS

| | | | |
|---|---|---|---|
| 1,484,942 | 2/1924 | Guy et al. | 74/606 R |
| 2,238,404 | 4/1941 | Spencer | 92/144 |
| 2,591,219 | 4/1952 | Vincent | 180/297 |
| 4,431,079 | 2/1984 | Suzuki | 180/297 |
| 4,435,994 | 3/1984 | Hata et al. | 74/606 R |
| 4,821,826 | 4/1989 | Lings | 180/297 |
| 5,007,307 | 4/1991 | Tamazawa et al. | 74/606 R |

FOREIGN PATENT DOCUMENTS

3838073 5/1990 Germany .
1313630 12/1989 Japan .

*Primary Examiner*—John J. Vrablik
*Attorney, Agent, or Firm*—Sixbey, Friedman, Leedom & Ferguson; Gerald J. Ferguson, Jr.; Donald R. Studebaker

[57] ABSTRACT

In a construction of a vehicle power train in which a crankshaft of an engine and a shaft of a transmission are arranged in a car-width direction and a differential is disposed near the transmission, a power transmission element composing a part of a power transmission passage from the engine to a drive wheel is reinforced. An extension part extending to the cylinder block side of the engine is provided with respect to a bearing part of a back idle gear of the transmission provided at a cylinder block upper of the engine, and an extreme end of the extension part is connected to a rear side part of the cylinder block upper. The bearing part of a front-wheel differential is arranged so as to contact to a side of the bearing part of the back idle gear. Accordingly, rigidity of the power train is enhanced and an open/close mode movement caused between the engine and the transmission is prevented.

10 Claims, 12 Drawing Sheets

CONSTRUCTION OF VEHICLE POWER TRAIN

BACKGROUND OF THE INVENTION

This invention relates to an improvement in a construction of a power train of a vehicle.

As a conventional construction of a vehicle power train, Japanese Patent Application Laying Open Gazette No. 1-313630 and German Patent Application Unexamined Gazette No. DE3838073 disclose that an engine and a transmission are in parallel with each other in a longitudinal direction of a vehicle, namely the engine is so arranged that an axial direction of a crankshaft thereof accords with a car-width direction and the transmission is so arranged at a rear of the engine that a shaft of the transmission is in parallel with the crankshaft of the engine. In both references, a front-wheel shaft and a differential for front wheels are disposed under the transmission.

However, in the power train construction having the engine and transmission which are in parallel with each other and the front-wheel differential, while a case of the transmission is integrally formed with a cylinder block of the engine, the transmission and the engine moves toward and away from each other at a delicately connected part of an integrally formed part thereof, namely, an open/close mode movement is caused owing to each independent movement of the transmission and the engine around respective principal shaft of inertia as centers. As a result, a distance between the crankshaft of the engine and an output shaft of the transmission is varied. Similarly, the respective open/close mode movements between the engine and the front-wheel differential and between the front wheel differential and the transmission are also caused. Therefore, vibration of the whole power train can be prevented insufficiently, and a power transmitting performance to a drive wheel is lowered.

SUMMARY OF THE INVENTION

This invention has its object of preventing each open/close mode movement therebetween to prevent the vibration of whole power train and to efficiently transmit the power to the drive wheel by reinforcing the construction of the power train having the engine and the transmission which are in parallel with each other and the front wheel differential.

There are some cases where the open/close mode movement remains more or less even though a reinforcement is provided to the power train. Another object of the present invention is to block an influence of the open/close mode movements through the reinforcement to the configuration of essential parts of the engine such as a combustion chamber.

To attain the above objects, in the present invention, a construction of a vehicle power train having an engine whose crankshaft is arranged in a car-width direction and a transmission arranged at rear of the engine in a longitudinal direction of the vehicle and a shaft of which is in parallel with the crankshaft of the engine, comprising: a power transmission passage for transmitting a power from the engine to a drive wheel; and a power transmission element arranged at the power transmission passage, composing a part of the power transmission passage and having a support part; wherein the support part of the power transmission element has an extension part extending to a side of the engine, and the extension part is interconnected to a vehicle front side part or a vehicle rear side part of the engine.

The support port of the power transmission element is specified to a bearing part of a back idle gear of the transmission.

In a construction of a vehicle power train having a differential for front wheels near the engine or the transmission, the support part of the power transmission element is composed of a bearing part of the front-wheel differential.

Further, the extension part of the support part of the power transmission element is connected around a vertical wall part between cylinders of the engine.

The support part of the power transmission element is composed of a bearing part of the back idle gear of the transmission and a bearing part of the front-wheel differential, and the bearing part of the front-wheel differential contacts with a side part of the bearing part of the back idle gear of the transmission.

The bearing part of the shaft of the transmission and a side part of the cylinder block of the engine which faces to the transmission are connected to each other by a reinforcement.

The bearing part of the shaft of the transmission and the bearing part of the front-wheel differential are connected to each other by a reinforcement.

The cylinder block of the engine and the bearing part of the front-wheel differential are connected to each other at respectively facing side parts by a reinforcement.

The reinforcement which connects the bearing part of the shaft of the transmission and the cylinder block of the engine is composed of a plurality of ribs which form respective spaces for absorbing a thermal deformation of the ribs.

The upper part of the bearing part of the transmission and the upper part of the cylinder block of the engine on a side facing to the transmission are connected by a reinforcement.

The reinforcement which connects the bearing part of the transmission and the cylinder block of the engine is arranged on a plane which connects an axial center of the shaft of the transmission and an axial center of the crankshaft of the engine.

The reinforcement which connects the bearing part of the transmission and the bearing part of the front-wheel differential is composed of an auxiliary of the engine.

In a construction of a vehicle power train in which the cylinder block of the engine are integrally formed with a case of the transmission, a space is formed at the integrally formed part of the engine and the transmission aside the cylinder of the engine.

In case with a multiple-cylinder engine, the spaces aside each cylinder are different in volume to one another.

Under the above construction, rigidity of the whole power train is improved, since the extension part which is interconnected to the engine is provided at the support part of the power transmission element of the transmission such as the bearing part of the back idle gear, the bearing part of the front-wheel differential. As a result, the open/close mode movement between the engine and the transmission is prevented at the support part, so that a distance between the crankshaft of the engine and the output shaft of the transmission is kept constant and the vibration of the differential is prevented. Consequently, engine power is transmitted to the drive wheel efficiently.

Particularly, since the extension part of the support part of the power transmission element is connected around the vertical wall between the engine cylinders, superior power transmission to the drive wheel is performed.

Since the bearing part of the front-wheel differential contacts with a side part of the bearing part of the back idle gear, the rigidity of the differential is further enhanced, decreasing the vibration.

The respective reinforcements connect between the cylinder block of the engine and the bearing part of the transmission, between the bearing part of the transmission and the front-wheel differential, and between the front-wheel differential and the cylinder block of the engine. Thus, the open/close mode movements therebetween are effectively prevented and the vibration of the whole power train is decreased.

In this case, the cylinder block of the engine and the bearing part of the transmission are connected for reinforcement to each other by a plurality of ribs, and the ribs are allowed to deform in the space thereamong by a thermal deformation of the cylinder block of the engine. Accordingly, the ribs receives by the deformation an influence which affects an axial center of the bearing part of the transmission, so that deviation of the bearing part of the transmission due to the thermal deformation of the cylinder block is effectively prevented.

Even with a large force causing the open/close mode movement affects between the upper part of the bearing part of the transmission and the upper part of the cylinder block of the engine, the open/close mode movement is restricted because these parts are connected to each other by the reinforcement.

Since the reinforcement is arranged on a plane which connects the axial center of the crankshaft of the engine and the axial center of the main shaft of the transmission, a distance variation between the crankshaft and the main shaft is saved, ensuring the efficient power transmission.

Since the bearing part of the transmission and the bearing part of the front-wheel differential are connected to each other by the auxiliary such as the alternator, the weight and cost are reduced without additional reinforcement provided.

In addition, while the cylinder block of the engine and the case of the transmission are integrally formed with each other, the space is formed at the integrally formed part aside the cylinder. Accordingly, remaining open/close mode movement of the engine and the transmission is absorbed at the space, so that no deformation of a cylinder liner located around the cylinder of the engine is caused and radiating noise caused at the transmission is reduced in the space.

In the multiple-cylinder engine, even with the respective spaces aside the cylinders, the radiating noise caused at the transmission does not resonate in the spaces because each space has different volume.

The above objects and features of the present invention will be apparent from the following description taken in connection with the accompanying drawings.

BRIEF DESCRIPTION OF THE DRAWINGS

The accompanying drawings show a preferred embodiment of the present invention, in which.

PREFERRED EMBODIMENT OF THE INVENTION

A preferred embodiment of the present invention is described below, with reference to the accompanying drawings.

FIGS. 1-5 show a construction of a power train for a front-wheel-drive automobile in a preferred embodiment of the present invention.

Figure 1:
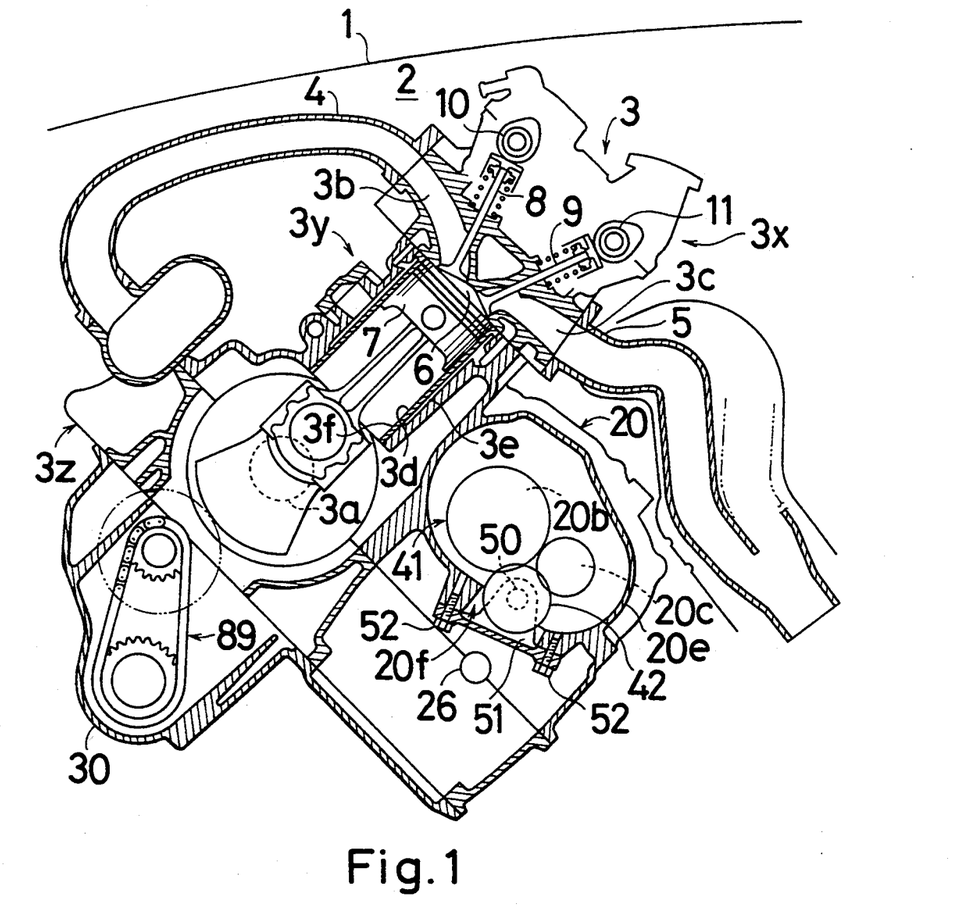
FIG. 1 is a vertical section of a power train.

In the figures, a reference numeral 1 designates a bonnet of a vehicle, and 2 designates an engine room formed under the bonnet 1. Disposed in the engine room 2 is a multi-pie-cylinder engine 3 whose crankshaft 3a is arranged in a car-width direction, which means that the engine 3 is disposed transversely in the car-width direction. The engine 3, as shown in FIG. 1, is inclined rearward of the vehicle at a given angle and has an intake port 3b at a front side of the body and an exhaust port 3c at a rear side thereof. The intake port 3b communicates with an intake pipe 4 extending frontward of the vehicle. The exhaust port 3c communicates with an exhaust pipe 5 extending obliquely rearward.

Figure 4:
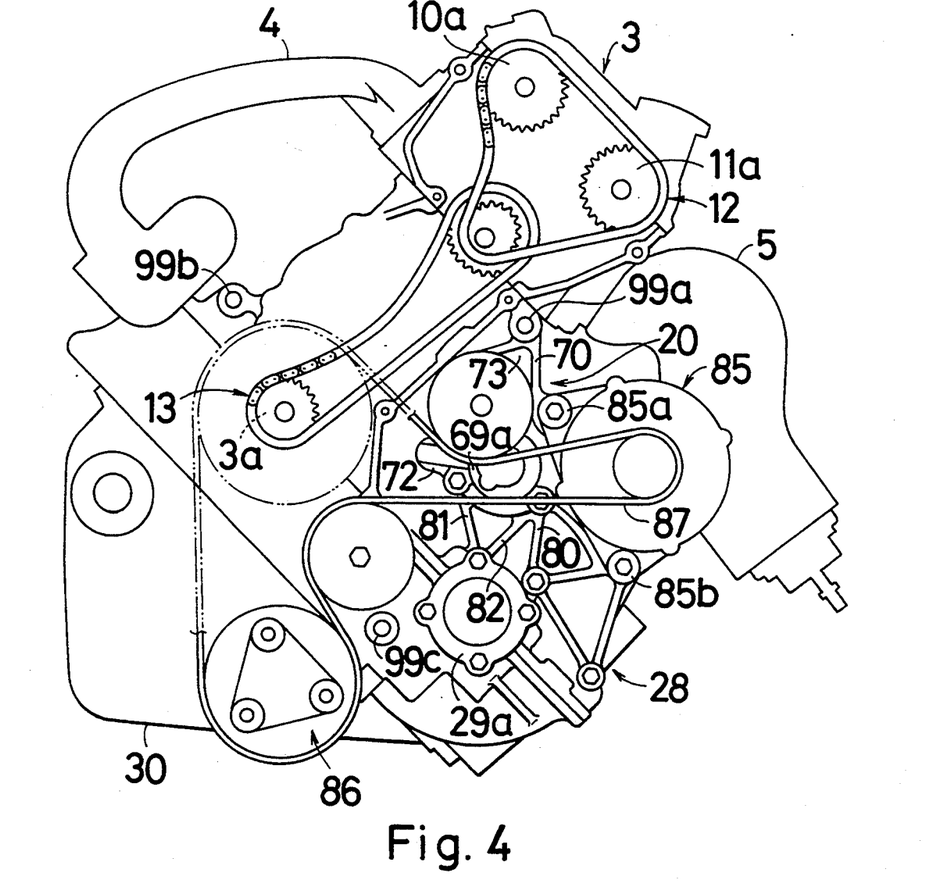
FIG. 4 is a section on a left side the of the power train.

In the engine 3, a combustion chamber 6 to which intake and exhaust ports 3b, 3c are open is changeable in its volume by a piston 7. An intake valve 8 and an exhaust valve 9 are disposed in the combustion chamber 6. A liner 3f is inserted into a cylinder 3d and a cooling channel 3e is formed between the cylinder 3d and the liner 3f. Camshafts 10, 11 are respectively arranged above intake and exhaust valve 8, 9, and are driven to rotate by the crankshaft 3a via two-stage type chains 12, 13 which drive driven sprockets 10a, 11a arranged at front end of the respective camshafts 10, 11, as shown in FIG. 4.

Figure 3:
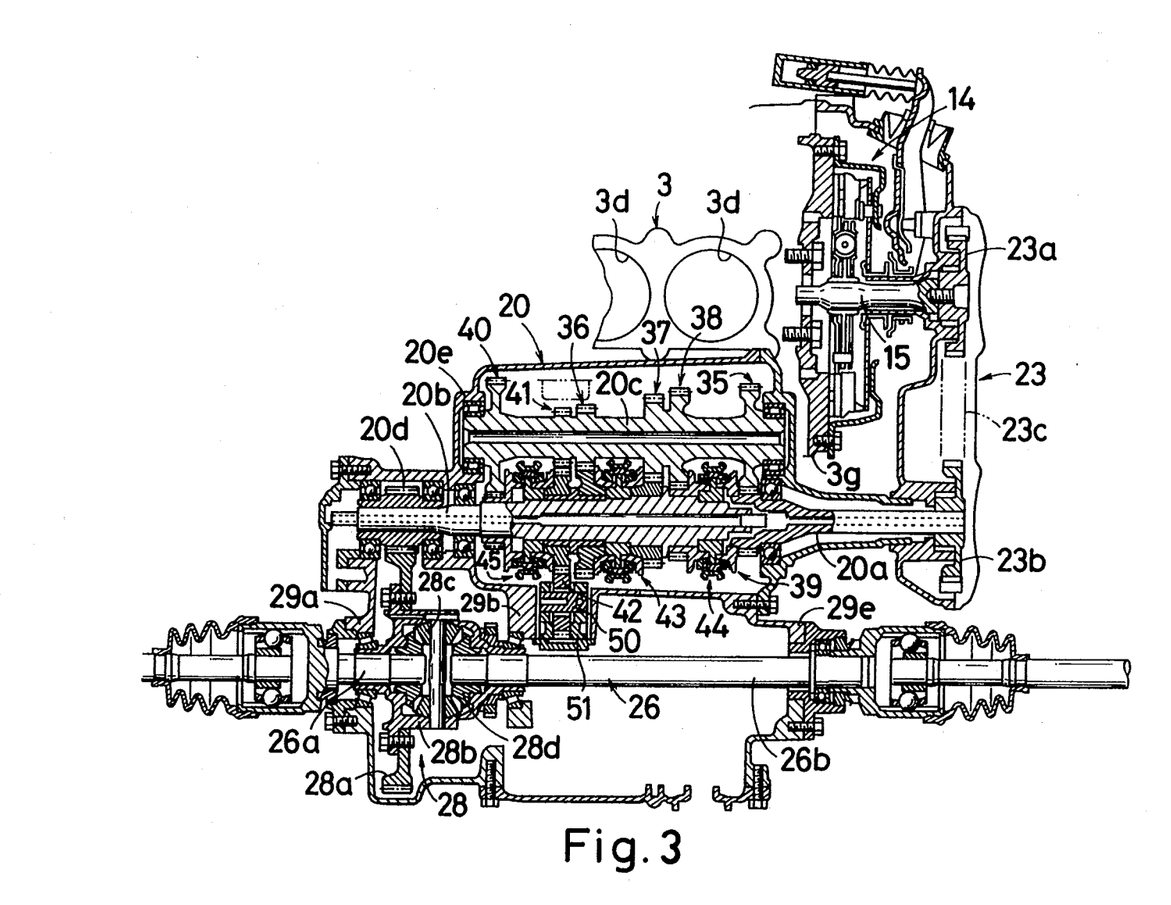
FIG. 3 is a development showing a whole power train construction.

A clutch device 14 disposed at a right end part of the engine 3 in FIG. 3 connects and disconnects an output shaft 15 to a flywheel 3g connected to an extreme end of the crankshaft 3a of the engine 3.

As shown in FIG. 1, a manual transmission 20, for example, of five-stage for advance and one-stage for back type, is disposed at the rear of the engine 3. The manual transmission 20 is arranged in the engine room 2 in such a fashion that an input shaft 20a of the transmission 20, an output shaft 20b arranged along a same shaft of the input shaft 20a and a counter shaft 20c disposed obliquely rearward of the output shaft 20b are located all in parallel with the crankshaft 3a of the engine 3, as shown in FIG. 3.

A power transmission mechanism 23 is arranged between the transmission 20 and the clutch device 14 and is composed of a drive sprocket 23a connected to a right end part in FIG. 3 of the output shaft 15, a driven sprocket 23b connected to the input shaft 20a of the transmission 20 and a chain 23c trained around both sprockets 23a, 23b. Power transmitted to the output shaft 15 is transmitted to the input shaft 20a of the transmission 20 via the power transmission mechanism 23 when the clutch device 14 is connected.

Referring to the transmission 20 in FIG. 3, a pair of gears 35 are arranged between the input shaft 20a and the counter shaft 20c for transmitting power from the input shaft 20a to the counter shaft 20c. First to fifth speed shift gears 36–40, a back gear 41 and a back idle gear 42 meshing with the back gear 41 are arranged as power transmission elements between the counter shaft 20c and the output shaft 20b. Arranged at the output shaft 20b are a synchronizer 43 for selectively meshing with first or second gear 36 or 37, a synchronizer 44 for selectively meshing with third or fourth gear 38 or 39 and a synchronizer 45 for selectively meshing with the fifth gear 40 or the back gear 41. A final drive pinion 20d is arranged at a right end part of the output shaft 20b.

Figure 9:
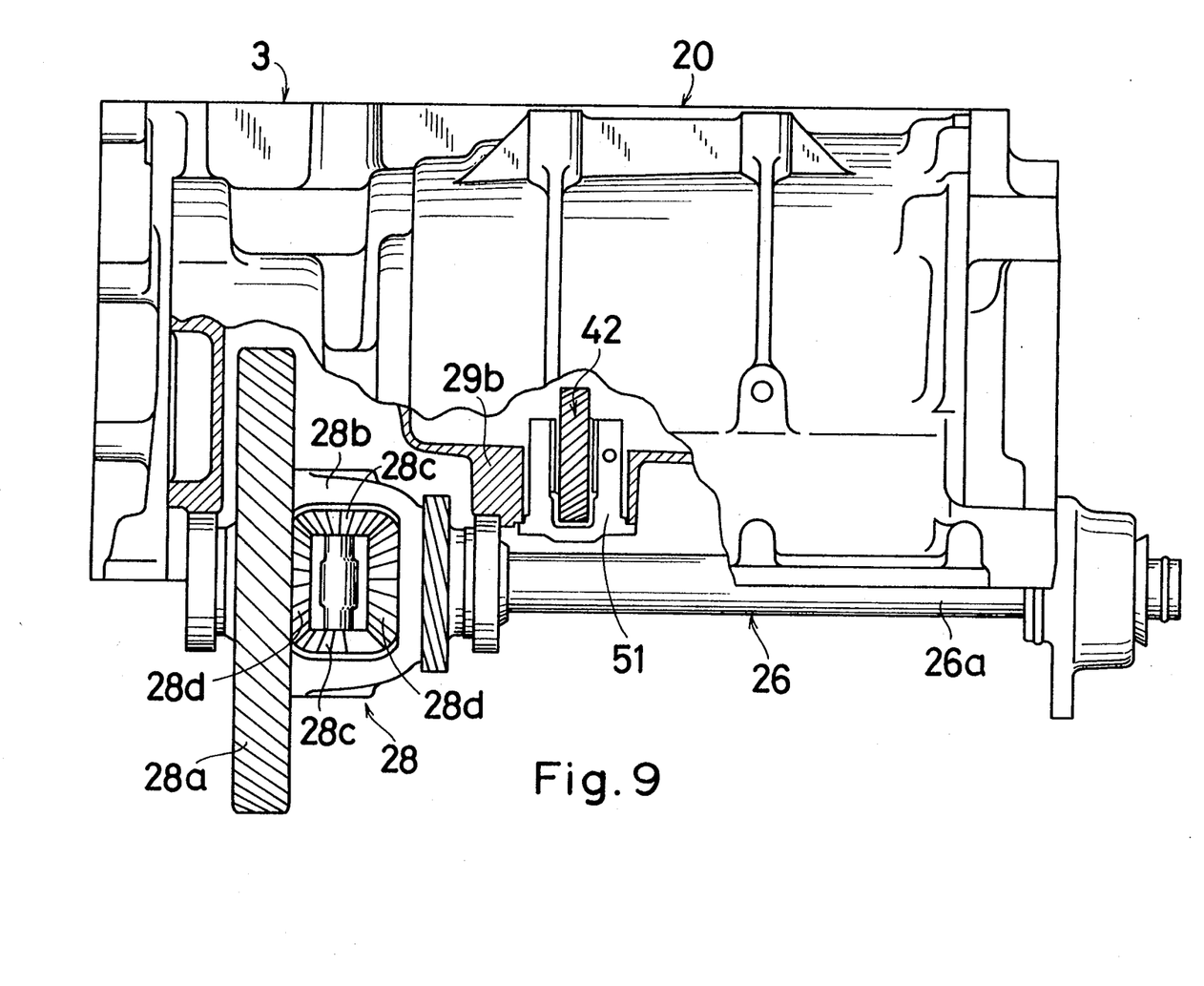
FIG. 9 is a perspective view of the power train around a differential of which is broken, seen from a rear of a vehicle.

The back idle gear 42 is rotatably fitted, as shown in FIGS. 1, 3 and 9, to a support shaft 50 which is supported and fixed to a bearing part 51 of the back idle gear 42 both ends of which are substantially triangular seen from a side. The bearing part 51 as a support part for the back idle gear 42 is fixed at front and rear ends thereof to a transmission case 20e with bolts 52, 52 in such a fashion that the back idle gear 42 is inserted from an opening 20f formed at a bottom surface of the transmission case 20e in FIG. 1 to mesh with the back gear 41.

As shown in FIGS. 1 and 3, a drive shaft 26 extends in the car-width direction under the transmission 20. A differential 28 for front wheels, as a power transmission element, is provided at the drive shaft 26 right under the final drive pinion 20d of the transmission 20, as shown in FIG. 3.

The front-wheel differential 28 is of planet gear type, and has a ring gear 28a meshing with the final drive pinion 20d of the transmission 20, a case 28b to which the ring gear 28a is connected, two pinion gears 28c arranged at the case 28b, and two side gears 28d connected to right and left shaft parts 26a, 26b of the drive shaft 26, as shown in FIGS. 3 and 9.

As illustrated in FIG. 3, the differential 28 is positioned at a rear of the engine in a longitudinal direction of the vehicle with the drive shaft 26 extending in a car-width direction of the vehicle as discussed hereinabove. The drive shaft 26 is supported along its length by bearings 29a, 29b and 29e. The bearings 29a, 29b and 29e each include an extension part which extends to a rear side of the engine which interconnect the bearings with a rear side pan of the engine as discussed hereinbelow. As can be further seen from FIG. 3, the differential 28 is positioned offset to one side of a center of the vehicle in the car-width direction with bearings 29a and 29b being arranged adjacent a right side and a left side of the differential respectively. Bearing 29a supports the right shaft 26a while bearing 29b supports a right end of the left of shaft 26b. Further, the remaining bearing 29e supports a left end of the left shaft 26b. With this arrangement, both the right shaft 26a and the left shaft 26b are supported in a manner such that equivalent behavior changes to the fight and left wheels can be transmitted to the offset differential 28 without causing an eccentric mesh of the gear teeth.

Figure 2:
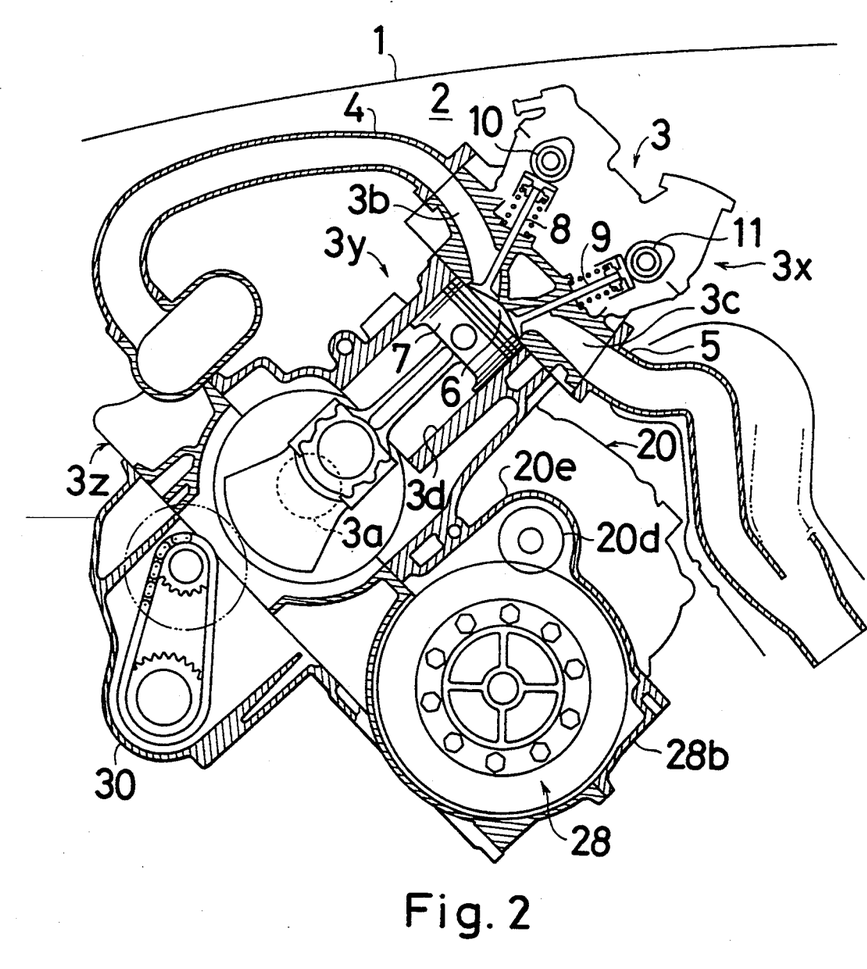
FIG. 2 is a vertical section of another part of the power train.
Figure 10:
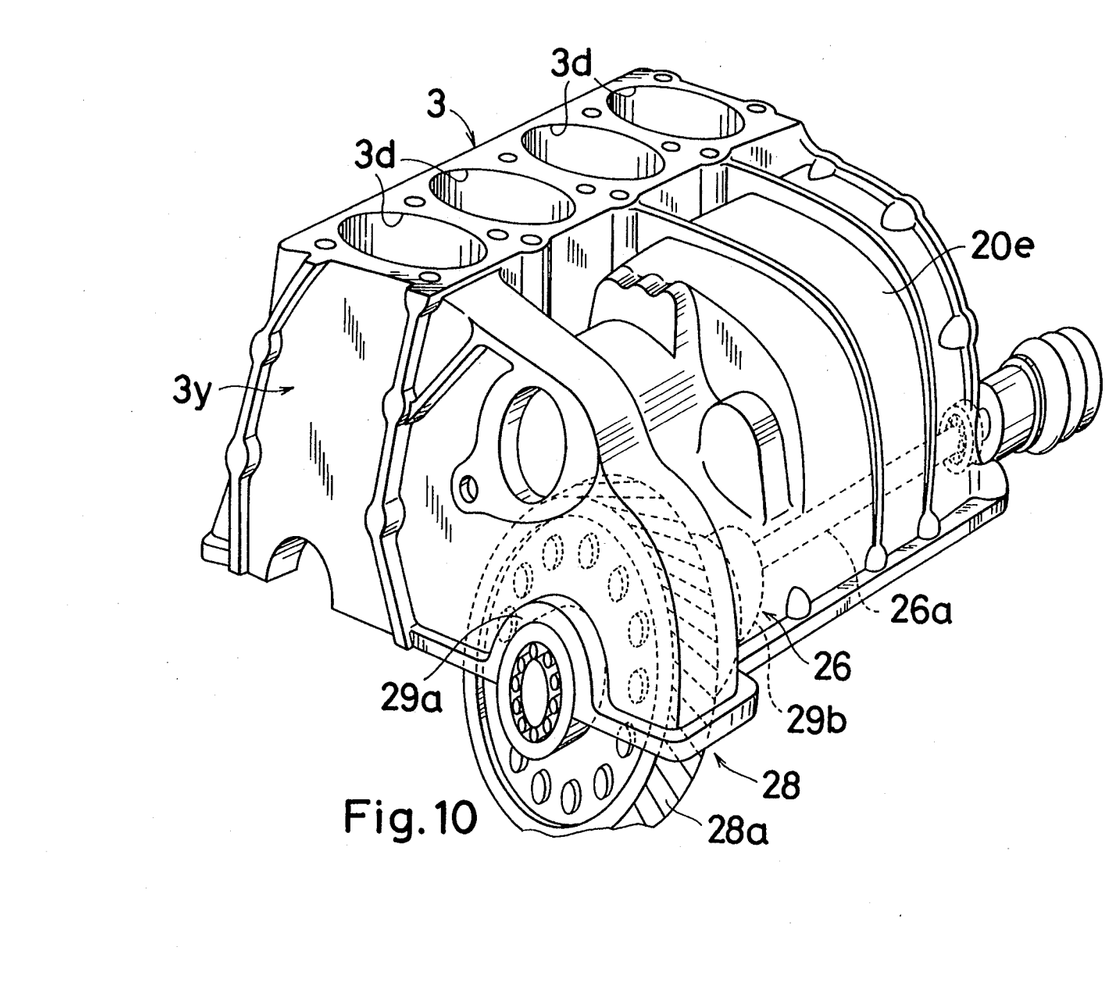
FIG. 10 is a perspective view of a vicinity of the cylinder block upper.

The engine 3 is defined into three parts: a cylinder head 3x; a cylinder block upper 3y located above a line which connects an axial center of the crankshaft 3a and that of the drive shaft 26; and a cylinder block lower 3z located under the line. An oil pan 30 is connected to a bottom surface of the cylinder block lower 3z. The cylinder block upper 3y extends, as shown in FIGS. 1, 2 and 10, in a longitudinal direction of the vehicle. The case 20e of the transmission 20 and an upper half of bearing parts 29a, 29b, and 29c of right and left shaft parts 26a, 26b of the differential 28 are integrally formed with the extending part of the cylinder block upper 3y.

Figure 5:
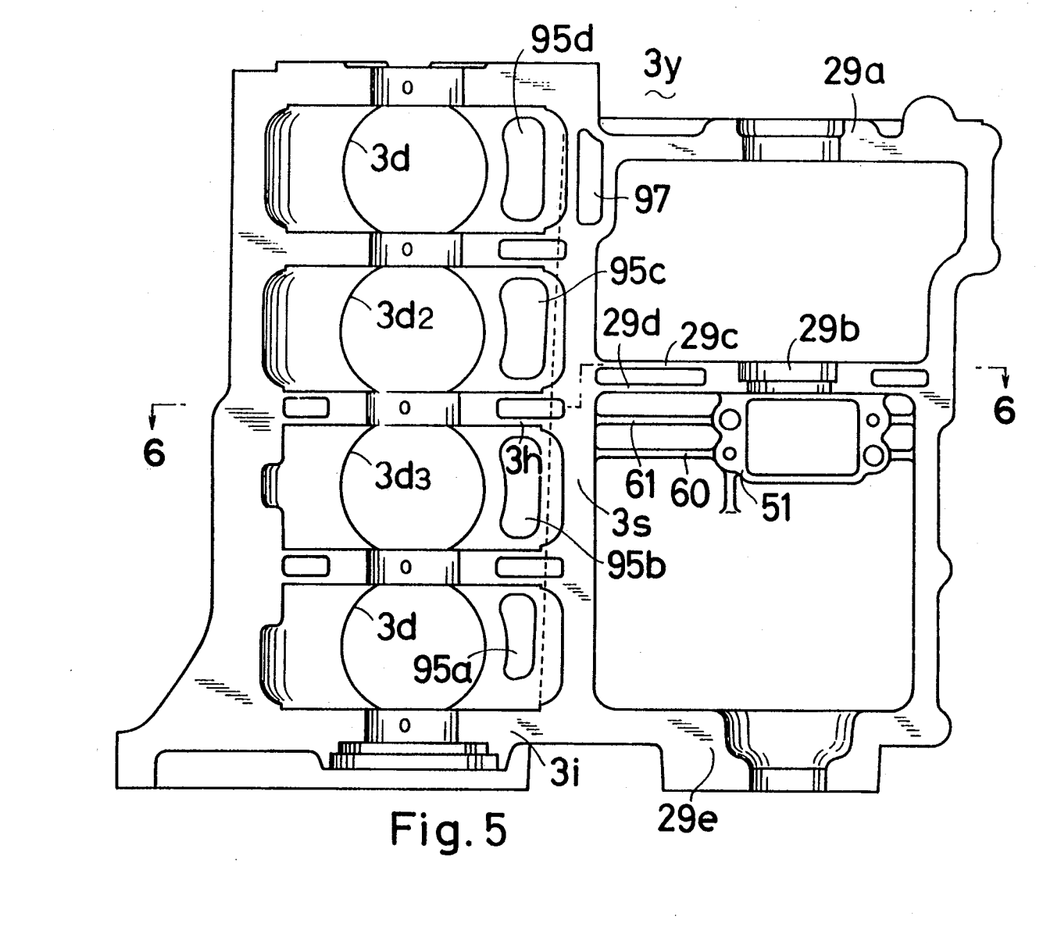
FIG. 5 is a bottom view of a cylinder block upper of an engine.

The cylinder block upper 3y is shown in detail in FIGS. 5–8. FIG. 5 is a bottom view, FIG. 6 a section, FIG. 7 a plan view and FIG. 8 a side view thereof. In FIG. 5, the bearing part 51 of the back idle gear 42 and the left bearing part 29b of the right shaft part 26b of the differential 28 are disposed at middle of the cylinder block upper 3y in right and left direction. Extension parts 60, 61 of two ribs extending to the engine 3 side are integrally formed at the bearing part 51 of the back idle gear 42. Extreme ends of the extension parts 60, 61 contact to a body side part 3s of the cylinder block upper 3y when the back idle gear 42 is assembled and fixed.

Figure 6:
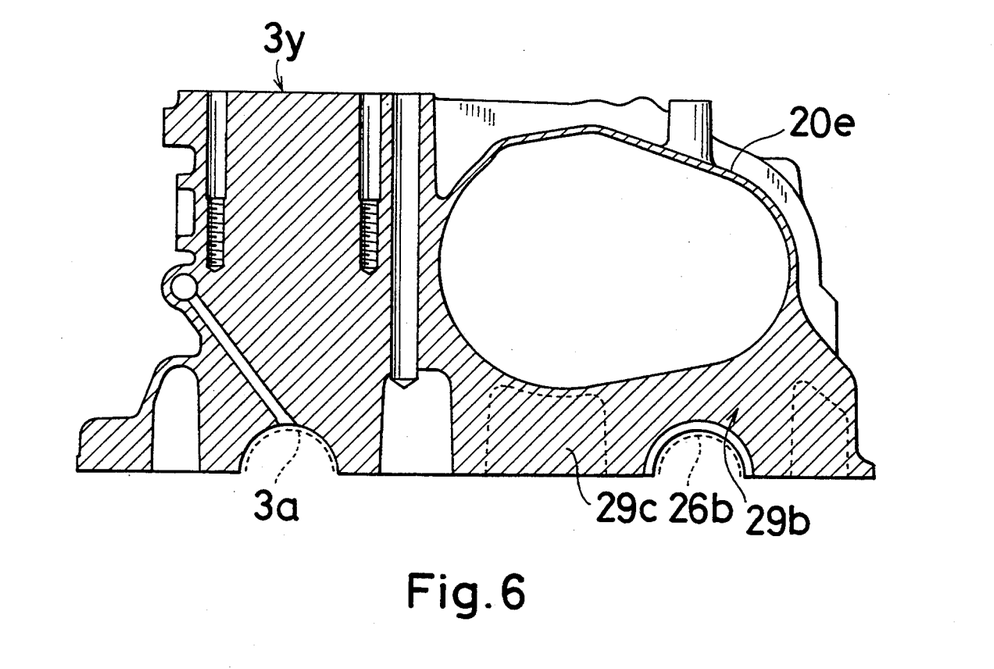
FIG. 6 is a section taken along a line 6—6 in FIG. 5.

As shown in FIGS. 5 and 6, two ribs 29c, 29d of the bearing part 29b as reinforcements which extend to the engine 3 side are integrally formed at the bearing part 29b of the differential 28 as a support part thereof. The ribs 29c, 29d are formed integrally around a vertical wall part 3h located between second and third cylinders 3d2, 3d3 of the cylinder block upper 3y of the engine 3. Namely, the bearing part 29b engages with the body side part 3s of the cylinder block upper 3y via the two ribs 29c, 29d. The bearing part 29b of the differential 28 is arranged so as to contact with a side part of the bearing part 51 of the back idle gear 42.

Figure 7:
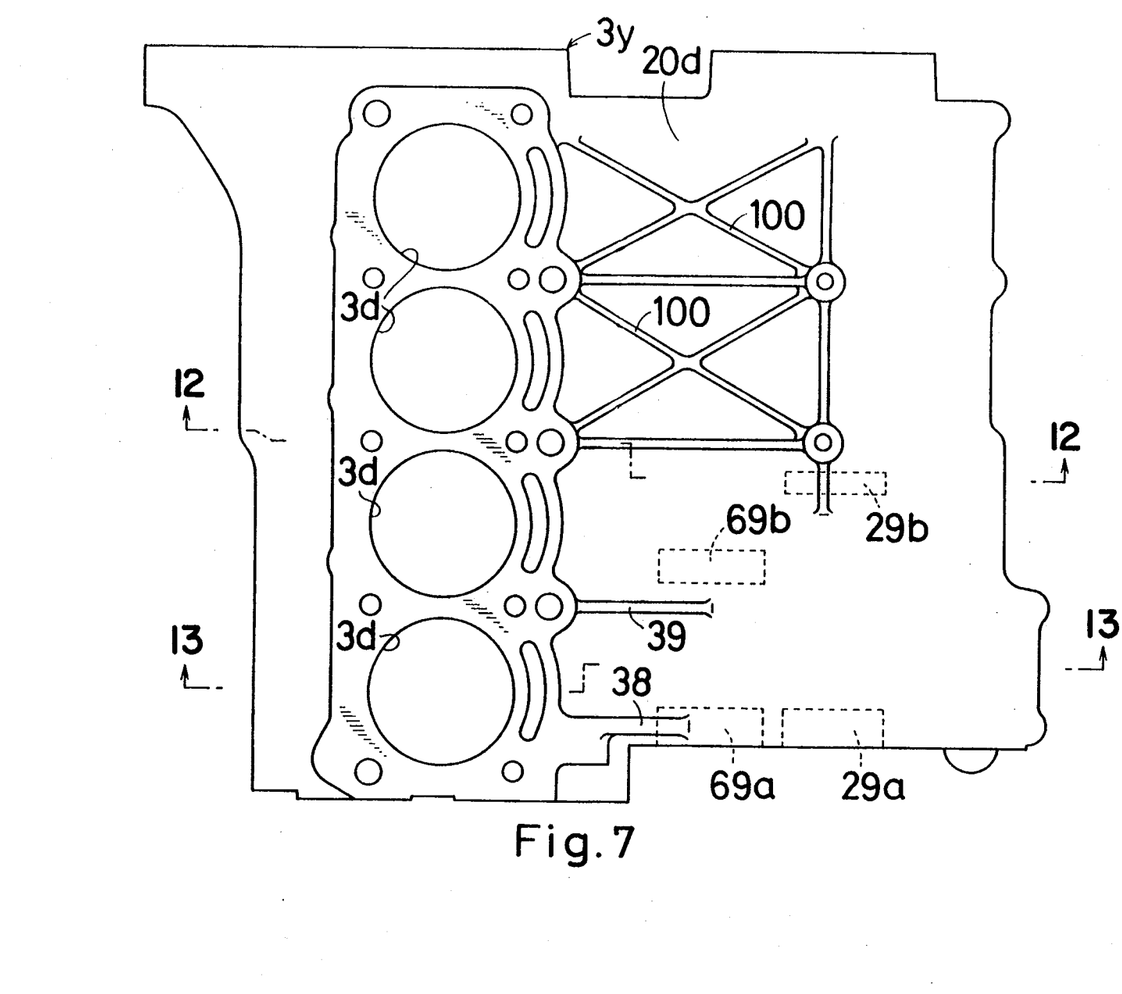
FIG. 7 is a plan view of the cylinder block upper of the engine.
Figure 8:
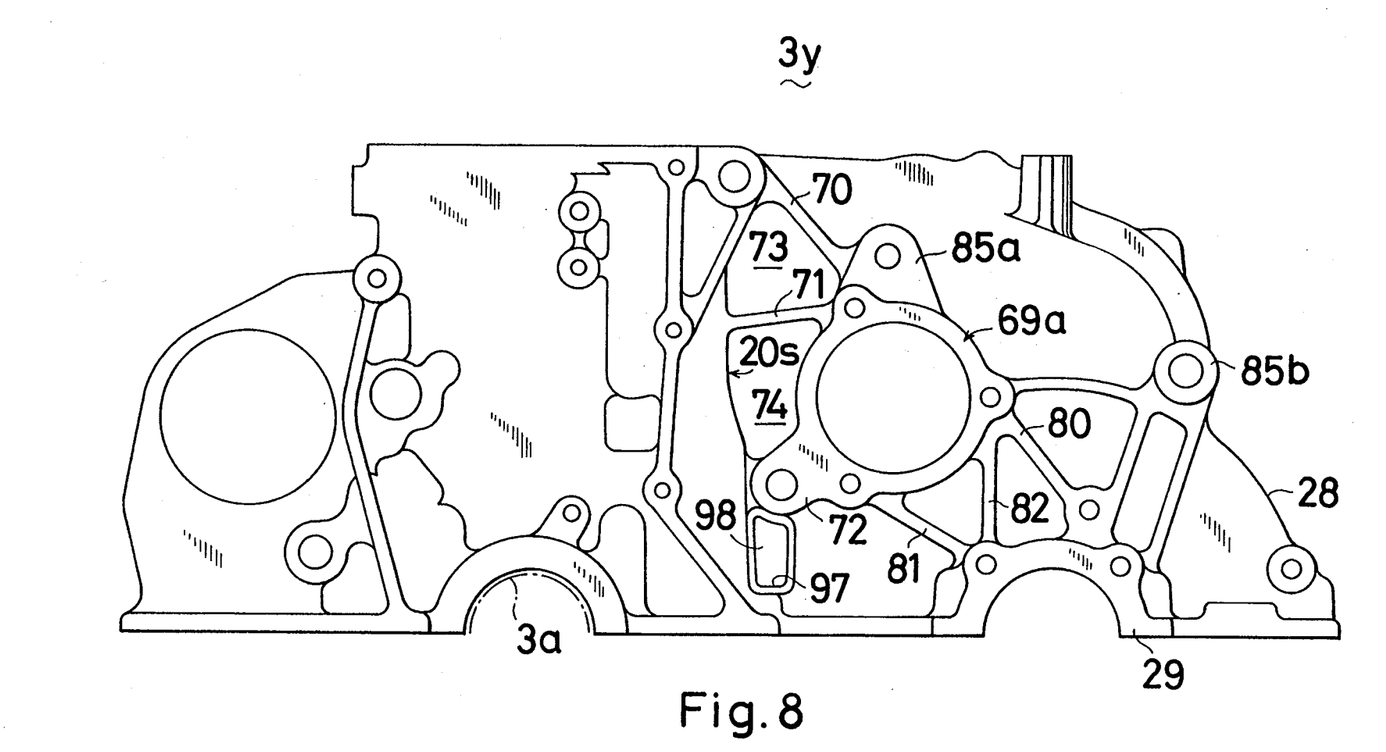
FIG. 8 is a side view of the cylinder block upper of the engine.

Referring to the cylinder block upper 3y in FIGS. 7 and 8, reference numerals 69a and 69b designate bearing parts for supporting at right and left of the final drive pinion 20c the output shaft 20b of the transmission 20. 29a is the bearing part of the left shaft part 26a of the differential 28. As shown in FIG. 8, a rib 70 as a reinforcement extends upwardly leftward in the figure in such a fashion that one end thereof is connected to an upper end of the left side bearing part 69a of the transmission 20 and the other end thereof is connected for reinforcement to an upper end of a rear side part 20s of the cylinder block upper 3y. A rib 71 as a reinforcement extends horizontally, leftwardly in the figure in such a fashion that one end thereof is connected to an upper end of the right side bearing part 69b of the transmission 20 and the other end thereof is connected for reinforcement to the rear side part 20s of the cylinder block upper 3y. Further, a rib 72 as a reinforcement is arranged on a plane surface which connects an axial center of the left side bearing part 69a of the transmission 20 and that of the crankshaft 3a of the engine 3. The rib 72 also reinforces and connects the lower part of the left side bearing part 69a of the transmission 20 to the rear side part 20s of the cylinder block upper 3y. The three ribs 70–72 forms a given volume spaces 73, 74 for allowing each ribs 70–72 to slightly deform by heat in a direction of shorter side.

A side part of the left side bearing part 69a of the transmission 20 and a side part of the bearing part 29a of the left shaft part 26a of the differential 28 which face to each other are connected for reinforcement to each other by two ribs 80, 81 as reinforcements, and also connected for reinforcement to each other by another rib 82 as a reinforcement for connecting the rib 80 on a side end part of the transmission 20 side and the other rib 81 on a side end part the differential 28 side.

Moreover, as shown in FIG. 4, an alternator 85 of auxiliaries is disposed obliquely rearward of the transmission 20 and is driven by the crankshaft 3a of the engine 3 via a drive pulley 87 together with another auxiliary 86 disposed at an oil pan 30 of the engine 3. The alternator 85 is supported with two support points 85a, 85b, i.e., a boss part located at an upper extreme end in FIG. 8 of the left side bearing part 69a of the transmission 20 and a boss part extending upwardly in FIG. 8 from the bearing part 29a of the differential 28. The alternator 85 reinforces and connects the bearing part 69a of the transmission 20 and the bearing part 29a of the differential 28.

Figure 11:
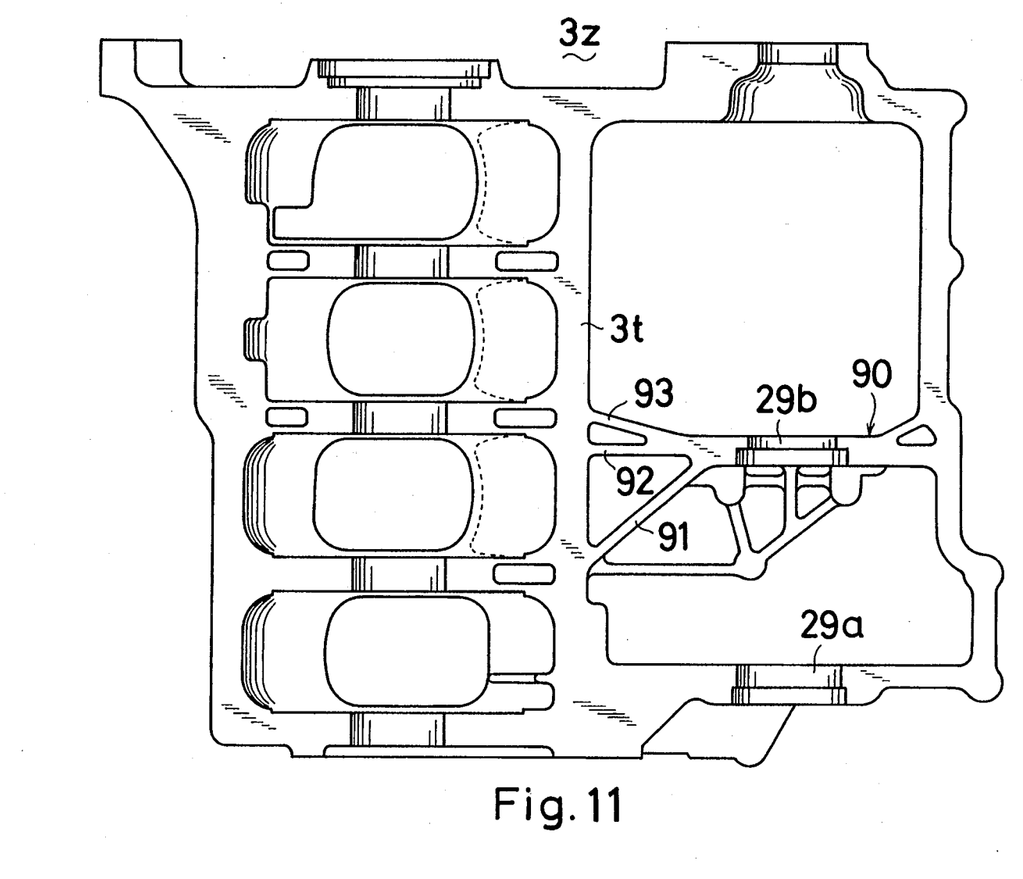
FIG. 11 is a plan view of a cylinder block lower of the engine.

FIG. 11 shows in detail the cylinder block lower 3z. In the figure, the cylinder block lower 3z extends to the differential 28 side. The extension part forms a shaft case 90 for covering the differential 28 and the drive shaft 26. A lower hemisphere part 29b of the bearing part of the right shaft part 26b of the differential 28 is formed integrally with the shaft case 90. The bearing part 29b on the engine 3 side which is on the left side in the figure is connected to each one end of three ribs 91, 92, 93 as reinforcements. The other ends of each ribs 91, 92, 93 are connected to a body side surface 3t of the cylinder block lower 3z with a given space left. Thus, the three ribs 91–93 connect for reinforcement the cylinder block lower 3z and the bearing part 29b of the right shaft part 26b of the differential 28.

Figure 12:
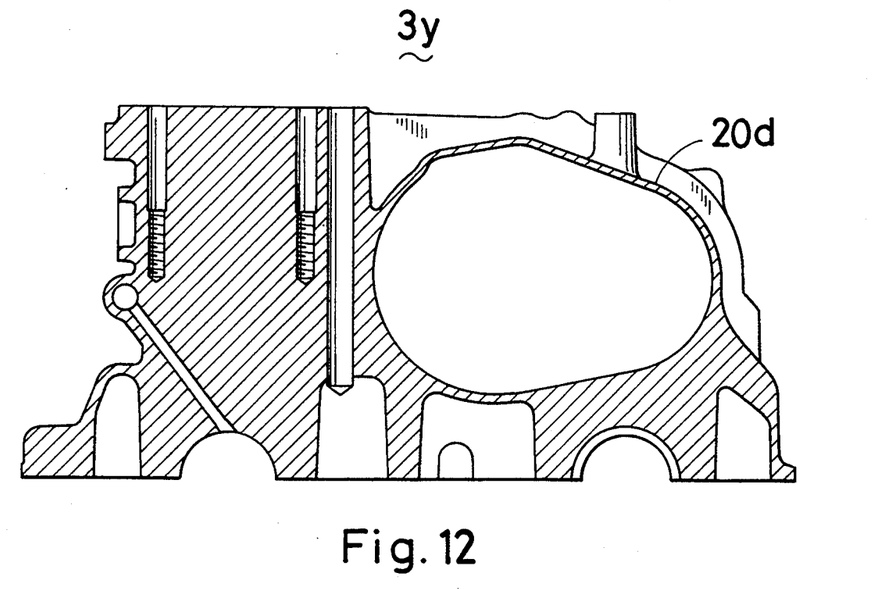
FIG. 12 is a section taken along a line 12—12 in FIG. 7.
Figure 13:
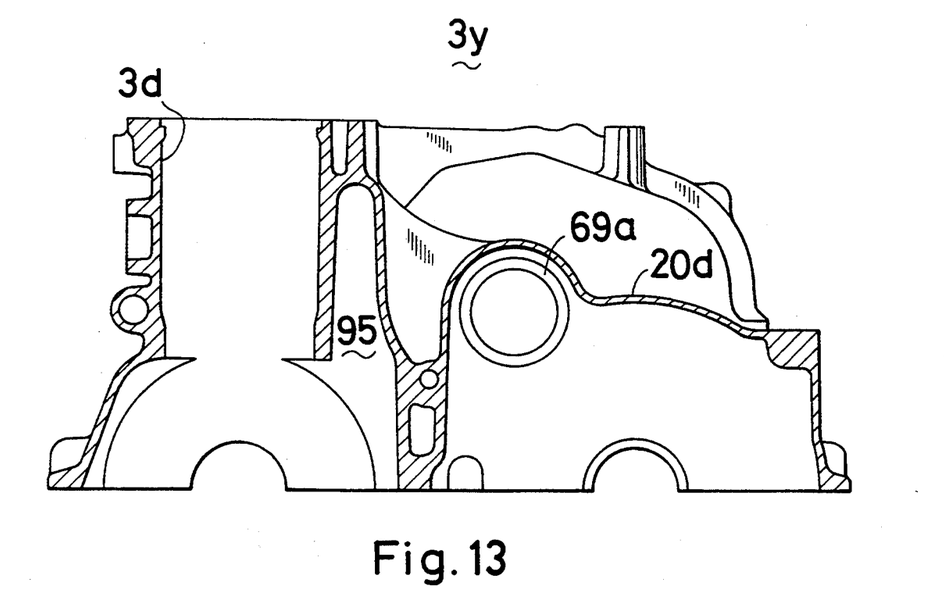
FIG. 13 is a section taken along a line 13—13 in FIG. 7.

In the cylinder block upper 3y, as shown in FIG. 12 of a section at 12—12 in FIG. 7 between the cylinders 3d, each partition wall of the cylinders 3d is integrally formed to continue to the case 20e of the transmission 20. Between each side part of the cylinders 3d and the case 20d of the transmission 20, respective spaces 95a–95d are formed only upper parts of which are closed, as shown in FIG. 13 of a section at 13—13 in FIG. 7 passing the center of the cylinder 3d. As shown in FIG. 5 of the bottom view, the nearer (the lower in FIG. 5) the flywheel 3g the cylinder 3d is, the thicker each vertical wall part 3s of the spaces 95a–95d of the cylinder block upper 3y on the transmission 20 side is made, as indicated by a broken line in the figure. Consequently, the nearer the flywheel 3g the cylinder 3d is, the smaller each volumes of the spaces 95a–95d is made, so that each volume thereof is different to each other.

In the cylinder block upper 3y in FIG. 5, an oil return hole 97 is formed at the vertical wall 3s between the cylinder 3d located the farthest from the flywheel 3g and the differential 28. An oil by which a drive valve system in the cylinder head 3x has been lubricated is return to the oil pan 30 through the return hole 97.

In Addition, in FIG. 8, an oil return 97 for returning the oil by which the drive chain and the like has been lubricated is also formed at a front wall part of the cylinder block upper 3y of the engine 3. A rib 98 is formed in the return hole 97 so as to face to the return hole 97 for blocking a reverse flow of the oil returned from the return hole 97 due to an operation of the piston 7 and for preventing lowering of rigidity of the block front wall part due to the return hole 97.

In FIG. 1, a reference numeral 89 is an auxiliary drive system located around the oil pan 30 for driving an oil pump or the like. In FIGS. 3 and 5, the right side bearing part 29e of the right shaft part 26b of the drive shaft 26 is integrally formed with a bearing part 3i of an extreme end part of the crankshaft 3a on the engine front side by extending the bearing part 31 rearwardly (rightward in FIG. 5). Thus the rigidity of the right shaft part 26b is enhanced.

Reference numerals 99a, 99b, 99c in FIG. 4 are respectively power train side support points of a mount for fixing the power train to a vehicle body: the support point 99a is located at an upper extreme end of the rear side part 3s of the cylinder block upper 3y; the support point 99b is located at a lower part of the front end surface of the cylinder block upper 3y; and the support point 99c is located substantially below the differential bearing 29a disposed at the cylinder block lower 3z. In FIG. 7, two cross ribs 100 reinforces an upper surface of the transmission case 20e.

Accordingly, in the above embodiment, the back idle gear 42 is inserted from the opening 20f located at the bottom surface of the transmission case 20e and the bearing part 51 of the back idle gear 42 is fixed to the transmission case 20e, so that the extension parts 60, 61 of the bearing part 51 which are composed of two ribs contact at the extreme ends thereof with the rear side part 3s of the cylinder block upper 3y. Accordingly, supporting rigidity of the output shaft 20b and the counter shaft 20c of the transmission 20 is further enhanced, with a result shifting of the axial centers thereof is sufficiently prevented. Accordingly, power transmission in the transmission 20 is efficiently performed with less vibration and less power loss.

The rigidity of the differential 28 is further enhanced since the bearing part 29b of the right shaft part 26b of the differential 28 is integrally formed with the cylinder block upper 3y of the engine 3 together with the ribs 29c, 29d extending to the engine 3 side. As a result, the vibration of the right shaft part 26b of the drive shaft 26 is effectively prevented, so that the power transmission at the differential 28 is efficiently performed with less power loss and no noise.

Further, since the extension parts 60, 61 of the bearing part 51 of the back idle gear 42 and the ribs 29c, 29d of the bearing part 29b of the differential 28 are respectively connected to the vertical wall part 3h between second and third cylinders 3d2, 3d3 of the cylinder block upper 3y of the engine 3, the supporting rigidity of the transmission 20 and the differential 28 is further enhanced, so that the engine power is transmitted effectively.

Particularly, as described above, the bearing part 29b of the differential 28 contacts with the side part of the bearing part 51 of the back idle gear 42 while the rigidity of the bearing part 51 thereof is enhanced by the extension parts 60, 61. Thus, thrust force affecting the differential 28 is received also by the bearing part 51 of the back idle gear 42, so that the vibration of the differential 28 is further prevented.

In addition, because the body rear side part 3s of the cylinder block upper 3y of the engine 3 and the bearing part 69a of the output shaft 20b of the transmission 20 are reinforced and connected to each other by three ribs 70–72, the open/close mode movement between the engine 3 and the transmission 20 is restricted, thus preventing the vibration with less noise.

Though strong force of the open/close mode movement acts between the upper end of the cylinder block upper 3y and the upper end of the bearing part 69a of the transmission 20, the open/close mode movement is effectively prevented with less noise since the rib 70 reinforces and connects therebetween.

Since the rib 72 is arranged on a plane which connects the axial center of the crankshaft 3a of the engine 3 and the axial center of the output shaft 20b of the transmission 20, the space therebetween can be ensured to be constant, thus performing excellent engine power transmission.

Moreover, the three ribs 70–72 form spaces 73, 74 so as to allow a thermal deformation of the ribs 70, 71 at a thermal expansion of the power train. Thus, the bearing parts 69a, 69b of the transmission 20 are hardly shifted.

The bearing part 69a of the transmission 20 and the right side bearing part 29a of the left shaft part 26a of the differential 28 are reinforced and connected to each other by the three ribs 80–82 and connected by the alternator 85. Accordingly, the rigidity of the transmission 20 and the differential 28 is ensured with light weight and lower cost by the alternator 85 as the reinforcement.

The left side bearing part 29b of the right shaft part 26b of the differential 28 and the body rear side part 3s of the cylinder block upper 3y of the engine 3 are reinforced and connected to each other by two ribs 29c, 29d, and the bearing part 29b of the differential 28 and the body rear side part 3t of the cylinder block lower 3z of the engine 3 are reinforced and connected to each other by the three ribs 91–93. Therefore, the rigidity between the engine 3 and the differential 28 is enhanced to prevent the vibration of the differential 28.

In addition, in case where the three ribs 70–72 prevents the open/close mode movement of the engine 3 and the transmission 20, the open/close mode movement which cannot have been prevented remains slightly even with such high rigidity therebetween. Such a remaining movement is apt to affect the liner of the cylinder 3d of the engine 3, the bearing part 69 of the transmission 20, and the like. However, the spaces 95a–95d of the cylinder block upper 3y of the engine 3 on the transmission 20 side absorbs the remaining movement. Accordingly, no deformation of the cylinder liner of the engine 3 is caused and radiating noise caused at the transmission 20 is diminished effectively in the spaces 95a–95d, so that the power train is silent as a whole.

In this case, since the spaces 95a–95d aside each cylinder 3d are so set that the nearer the flywheel 3g the cylinder is located, the smaller the volume thereof is made. Thus, the volumes are different from one another. As a result, each space 95a–95d has different resonance frequency, which means that radiating noise caused at the transmission 20 does not resonate at the spaces 95a–95d.

We claim:

1. A construction of a vehicle power train comprising:

an engine having a crankshaft arranged in a car-width direction, the engine being formed by a cylinder block;

a differential located at a rear of the engine in a longitudinal direction of the vehicle, a shaft of which is in parallel with the crankshaft of the engine; and three beatings for supporting the shaft in parallel;

wherein the three beatings of the shaft of the differential and a side part of the cylinder block of the engine which faces to the shaft of the differential are connected to each other by a reinforcement and said differential is positioned offset to one side in the car-width direction from a center of the vehicle in the car-width direction, and two of said three bearings are arranged respectively adjacent a right side and a left side of the differential in the car-width direction of the vehicle with a remaining one of said three beatings arranged farther from the differential than said two bearings and located on an opposite side in the car-width direction than the offset differential.

2. The construction of a vehicle power train as defined in claim 1, wherein the reinforcement which connects the bearings of the shaft of the differential and the cylinder block of the engine is composed of a plurality of ribs, and the ribs form respective spaces for absorbing a thermal deformation of the ribs.

3. The construction of a vehicle power train as defined in claims 1, wherein the reinforcement which connects the bearing of the shaft of the differential and the cylinder block of the engine connects an upper part of the bearings of the differential and an upper part of the cylinder block of the engine on a side facing to the differential.

4. The construction of a vehicle power train as defined in claim 1, wherein the reinforcement which connects the bearings of the differential and the cylinder block of the engine is arranged on a plane which connects an axial center of the shaft of the differential and an axial center of the crankshaft of the engine.

5. A construction of a vehicle power train having an engine whose crankshaft is arranged in a car-width direction and a transmission arranged at a rear of the engine in a longitudinal direction of the vehicle, a shaft of which is in parallel with the crankshaft of the engine, comprising:

a power transmission shaft for transmitting power from the engine to a drive wheel;

a differential arranged at the power transmission shaft; and three bearings for supporting the power transmission shaft in parallel;

wherein each bearing of the power transmission shaft has an extension part extending to a side of the engine, and each extension part is interconnected to a vehicle rear side part of the engine and said differential is positioned offset to one side in the car-width direction from a center of the vehicle in the car-width direction, and two of said three bearings are arranged respectively adjacent a right side and a left side of the differential in the car-width direction of the vehicle with a remaining on of said three bearings arranged farther from the differential than said two bearings and located on an opposite side in the car-width direction than the offset differential.

6. The construction of a vehicle power train as defined in claim 5, wherein at least one of the extension parts of the bearings of the power transmission shaft is connected around a vertical wall part between cylinders of the engine.

7. The construction of a vehicle power train as defined in claim 5, wherein the differential is for front wheels at a vicinity of the engine and the transmission.

8. The construction of a vehicle power train as defined in claim 7, further comprising a beating part of the back idle gear of the transmission, wherein the bearing part of the front-wheel differential contacts with a side part of the bearing part of the back idle gear of the transmission.

9. The construction of a vehicle power train as defined in claim 1, wherein the engine is inclined rearwardly of a vehicle body.

10. The construction of a vehicle power train as defined in claim 5, or 1, wherein the engine has a plurality of cylinders, liners disposed respectively within the cylinders, and cooling channels respectively formed between the cylinders and the liners.

* * * * *